Patented July 25, 1950

2,516,626

UNITED STATES PATENT OFFICE 2,516,626

TETRAHYDROPYRIMIDINE COMPOUNDS AND METHOD FOR THEIR PREPARATION

Vernon E. Haury, Simi, Calif., assignor to Shell Development Company, San Francisco, Calif., a corporation of Delaware No Drawing. Application September 3, 1948, Serial No. 47,746

16 Claims. (Cl. 260—251)

This invention relates to tetrahydropyrimidine compounds and to a method for preparing the same by reacting ammonia and a monoketone in the presence of an acidic condensation catalyst.

The term "tetrahydropyrimidine" is employed herein to designate those compounds of the general formula

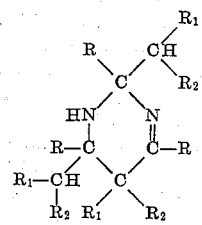

wherein the various radicals indicated by R represent the same monovalent organic radical and wherein the radicals indicated by $R_1$ and $R_2$, which may be the same or different, are members of the group consisting of the hydrogen atom and monovalent organic radicals. Compounds embodying the foregoing structure, which more properly are termed "2,3,4,5-tetrahydropyrimidines," possess a variety of useful and unexpected properties including those of a physiological nature, and they are particularly useful as organic intermediates.

It is our discovery that novel tetrahydropyrimidine compounds may be produced by reacting a monoketone with ammonia in the presence of an acidic condensation catalyst, the reaction proceeding according to the following general equation:

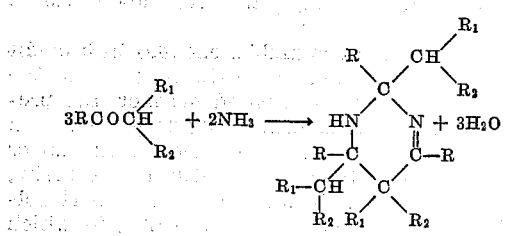

For example, it has been discovered that by reacting a ketone such as acetone with anhydrous ammonia at a suitably elevated temperature and in the presence of an acidic condensation catalyst such as hydrochloric acid or zinc chloride, there is obtained the highly alkylated pyrimidine compound 2,2,4,4,6-pentamethyl-2,3,4,5-tetrahydropyrimidine. Inasmuch as all of the tetrahydropyrimidine compounds referred to herein are of the 2,3,4,5-tetrahydro variety, for convenience of description these numerals will hereinafter be omitted both when naming particular compounds as well as in referring to tetrahydropyrimidines generally.

The ketones which may be employed as reactants in carrying out the process of the present invention are the monocarbonyl compounds wherein the carbonylic carbon atom and an adjacent (alpha) carbon atom bearing at least one hydrogen atom are members of an open-chain of carbon atoms. Such ketones may be represented by the general structural formula $RCOCH(R_1)R_2$ wherein R represents a monovalent organic radical, preferably hydrocarbyl in nature, and $R_1$ and $R_2$, which may be the same or different, are selected from the group consisting of the hydrogen atom and monovalent organic radicals, which again are preferably of the hydrocarbyl variety. A still more preferred class of ketone reactants comprises that wherein R is an alkyl radical and $R_1$ and $R_2$ are either hydrogen atoms or alkyl radicals. Thus, representative hydrocarbyl groups which R, $R_1$ and $R_2$ (when not hydrogen) may represent are alkyl radicals such as methyl, ethyl, n-propyl, isopropyl, the various butyl, amyl hexyl, heptyl and octyl radicals; aralkyl radicals such as the benzyl, methyl benzyl, phenyl ethyl, phenyl propyl, and naphthyl methyl radicals; alkaryl radicals such as the methyl phenyl, ethyl phenyl, propyl phenyl, methyl naphthyl, and ethyl naphthyl radicals; aryl radicals such as the phenyl, methyl naphthyl, and ethyl naphthyl radicals; aryl radicals such as the phenyl and naphthyl radicals; cycloparaffinic or cycloaliphatic hydrocarbon radicals such as cyclopentyl, methyl cyclopentyl, dimethyl cyclopentyl, ethyl cyclopentyl, cyclohexyl, methyl cyclohexyl, polymethyl cyclohexyl, and propyl cyclohexyl radicals. These radicals may contain substituents such as the hydroxyl, nitro, or halogen atoms provided that the substituent group is of a kind and in such a position in the molecule as not to interfere with the effective practice of the process of the invention. Thus, suitable substituted radicals are the hydroxymethyl, hydroxyethyl, hydroxypropyl, hydroxybutyl, hydroxyphenyl, hydroxynaphthyl, hydroxycyclopentyl, hydroxycyclohexyl, nitromethyl, nitrophenyl, chloromethyl, chloroethyl and bromophenyl radicals.

It will be realized that the particular ketone reactant selected will depend on the tetrahydropyrimidine compound it is desired to prepare. Thus, the following table illustrates the preparation of particular tetrahydropyrimidine compounds by reaction of ammonia with the appropriate ketone in the presence of an acidic condensation type catalyst:

| Ketone Reactant | Tetrahydropyrimidine Product |
|---|---|
| Acetone | 2,2,4,4,6-pentamethyltetrahydropyrimidine. |
| diethyl ketone | 2,2,4,4,6-pentaethyl-5-methyltetrahydropyrimidine. |
| Methyl ethyl ketone | 2,4-dimethyl-2,4,6-triethyltetrahydropyrimidine. |
| methyl propyl ketone | 2,4-dimethyl-2,4,6-tripropyltetrahydropyrimidine. |
| methyl octyl ketone | 2,4-dimethyl-2,4,6-trioctyltetrahydropyrimidine. |
| Acetophenone | 2,4-dimethyl-2,4,6-triphenyltetrahydropyrimidine. |
| Methyl benzyl ketone | 2,4-dimethyl-2,4,6-tribenzyltetrahydropyrimidine. |
| Ethyl benzyl ketone | 2,4-diethyl-5-methyl-2,4,6-tribenzyltetrahydropyrimidine. |
| Methyl orthochlorobenzyl ketone | 2,4-dimethyl-2,4,6-triorthochlorobenzyltetrahydropyrimidine. |
| Methyl betachloroethyl ketone | 2,4-dimethyl-2,4,6-tribetachloroethyltetrahydropyrimidine. |
| Methyl 3-hydroxypropyl ketone | 2,4-dimethyl-2,4,6-tri-(3-hydroxylpropyl)-tetrahydropyrimidine. |
| Isopropyl phenyl ketone | 2,4-isopropyl-5,5-dimethyl-2,4,6-triphenyltetrahydropyrimidine. |
| Ethyl alpha-methylbenzyl ketone | 2,4-dialpha-methylbenzyl-5-methyl-5-phenyl-2,4,6-triethyltetrahydropyrimidine. |

While a wide variety of ketones may be substituted for those set forth in the preceding table with the production of a corresponding tetrahydropyrimidine, a particularly valuable class of tetrahydropyrimidines is that whose members are prepared by reacting with ammonia, in the presence of an acidic condensation catalyst, a monoketone containing from 3 to 10 carbon atoms in the molecule and having only hydrocarbyl groups attached to the carbonyl carbon atom. Such pyrimidines may be defined as tetrahydropyrimidines containing from 9 to 30 carbon atoms in the molecule and having a total of at least five separate hydrocarbyl groups attached to not less than 3 different carbon atoms of the (2,3,4,5-) tetrahydropyrimidine nucleus, said nucleus being regarded as having the structure

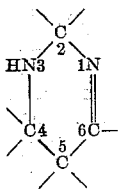

Suitable compounds coming within this category are 2,2,4,4,6-pentamethyltetrahydropyrimidine; 2,4-dimethyl-2,4,6-tripropyltetrahydropyrimidine; 2,4-diethyl-5-methyl-2,4,6-tribenzyltetrahydropyrimidine; 2,4-isopropyl-5,5-dimethyl-2,4,6-triphenyltetrahydropyrimidine; and 2,4-dimethyl-2,4,6-triethyltetrahydropyrimidine, which compounds are prepared from the appropriate ketone as indicated in the table above.

A still more preferred class of tetrahydropyrimidines is that prepared by the reaction of ammonia, in the presence of an acidic condensation catalyst, with monoketones containing from 3 to 10 carbon atoms and with only alkyl groups, at least one of which is the methyl radical, attached to the carbonyl carbon atom. In other words, such ketones are those wherein, in the general formula $RCOCH(R_1)R_2$, $R_1$ and $R_2$ are hydrogen atoms and R is an alkyl radical of from 1 to 8 carbon atoms. Representative tetrahydropyrimidines coming within this more preferred class are: 2,2,4,4,6-pentamethyltetrahydropyrimidine; 2,4-dimethyl-2,4,6-triethyltetrahydropyrimidine; 2,4-dimethyl-2,4,6-tripropyltetrahydropyrimidine; 2,4-dimethyl-2,4,6-triisopropyltetrahydropyrimidine; 2,4-dimethyl-2,4,6-tributyltetrahydropyrimidine; 2,4-dimethyl-2,4,6-trioctyltetrahydropyrimidine. These compounds may be generically referred to as 2,4-dimethyl-2,4,6-trialkyltetrahydropyrimidines containing from 9 to 30 carbon atoms in the molecule.

The catalyst necessarily employed in carrying out the process of this invention comprises one or more of the compounds generally termed "acidic condensation-type catalysts." Appropriate compounds coming within the scope of this term are acids themselves, as $CH_3COOH$, $(COOH)_2$, $HCl$, $HNO_3$, $H_2SO_4$, $HBr$ and $H_3PO_4$, for example, or compounds such as $ZnCl_2$, $FeCl_3$, $NH_4Cl$ or $CaCl_2$ which give an acid reaction in aqueous solution. The amount of catalyst used may be varied depending on a number of factors, including the time and temperature of reaction as well as the nature of the particular ketone reactant and catalyst selected. However, good results have been obtained through use of from 0.0001 to 0.1, and preferably of from 0.001 to 0.01, mole of catalyst per mole of ketone reactant. The reaction will proceed to a limited extent with even smaller amounts of catalyst, though with total elimination of catalyst the production of tetrahydropyrimidine product may be regarded as negligible. Thus, reaction of 20 moles of acetone with 16 moles of ammonia for 4 hours at 60 to 70° C. without catalyst yielded less than 10 grams of 2,2,4,4,6-pentamethyltetrahydropyrimidine, whereas the same process when conducted in the presence of 0.01 mole of concentrated hydrochloric acid resulted in the conversion of from 45 to 60% of the acetone to the desired 2,2,4,4,6-pentamethyltetrahydropyrimidine product. Further, while larger amounts of catalyst than 0.1 mole per mole of ketone reactant may be used without harmful results, such additions are normally unproductive of further benefit.

As has been indicated in the general equation given above, the ammonia and ketone reactants combine in the ratio of 0.66 mole of ammonia for each mole of ketone. Nevertheless, the reaction goes forward in an efficient manner even with one or the other of the reactants in stoichiometric excess. Thus, good results have been obtained through use of from 0.25 to 1.5 moles of ammonia per mole of ketone; and the preferred practice is to supply the reactants in an ammonia/ketone mole ratio which may vary from about 0.5 to about 1.

While the ammonia and ketone may be brought into reactive engagement in the presence of the acidic catalyst in any desired manner, the preferred practice is to bring anhydrous ammonia into contact with the liquid ketone, the latter being present either as a naturally occurring liquid or dissolved in an appropriate inert solvent, as hexane, dioxane, or the like, in which liquid the catalyst is also present. Under these conditions the reaction proceeds slowly at room temperatures and pressures, though the same is greatly accelerated at superatmospheric pressures, and to a lesser extent, by heating. When superatmospheric pressures are used, the pressure should be sufficiently great to effect solution in the liquid ketone of a substantial portion of the ammonia present. Thus, whereas pressures of but 3 to 5 atmospheres will normally suffice for this purpose at reaction temperatures between 20 and 50° C., much higher pressures, as 10 to 50 or more atmospheres, will be required at temperatures above 75° C. and particularly above 100° C. As concerns the reaction temperature, a suitable range is from 15 to 150° C., though a preferred range is from 25 to 100° C. However, the use of lower and even higher temperatures than those here indicated is entirely permissible, though below 15° C. the reaction becomes unduly slow, whereas above 150° C. the quantity of by-products formed is often excessive.

The required reaction time commensurate with relatively complete reaction will vary depending upon the conditions prevailing in the reaction zone. However, within the temperature range of from 15 to 150° C., and at superatmospheric pressures effective to maintain a substantial portion of the ammonia present in solution in the liquid ketone, for which purpose pressures of from 3 to 50 atmospheres are generally satisfactory, reaction periods of from ½ to 5 hours will normally suffice. For example, a reaction which goes to completion in approximately 2 hours at 100° C. will normally require about 3½ hours at 30° C. and from 4½ to 5 hours at 15° C. When conducting the operation in a batch manner in the liquid phase and in a closed system at superatmospheric pressures, progress of the reaction is generally evidenced by a gradual pressure drop, the reaction being deemed complete when the pressure remains at a fairly constant level for an appreciable length of time.

The tetrahydropyrimidine product may be recovered from the reaction mixture by any suitable means such as fractional distillation, treatment with selective solvents, or the like. However, fractional distillation is the preferred separation method and when practiced requires that the material to be distilled be first separated from any water present. This dehydration may be effected, for example, by the addition of caustic in either the solid and concentrated form, with the organic material to be distilled being drawn off as an anhydrous upper layer. An alternative dehydration method is to dilute the reaction mixture with benzene or other appropriate hydrocarbon; the upper, organic layer is then separated from the aqueous layer, following which it is neutralized and distilled, neutralization being here an essential step.

The novel tetrahydropyrimidines prepared according to the process of this invention have a wide field of utility. In addition to possessing medicinal properties generally, they also serve as valuable intermediates in the preparation of other chemical compounds. Thus, in copending application, Serial No. 736,610, filed March 24, 1947, now Patent Number 2,486,648, there is disclosed a method for producing beta-diamines from tetrahydropyrimidines, whereas in copending application, Serial No. 792,847, filed December 19, 1947, now Patent Number 2,497,548, there is disclosed a method for converting tetra-hydropyrimidines into beta-amino alcohols.

The following examples illustrate certain specific embodiments of the present invention:

Example I

Acetone was reacted with ammonia to produce 2,2,4,4,6-penta-methyltetrahydropyrimidine. In carrying out this reaction, 1218 grams of acetone were placed in a suitable reaction vessel together with 235 grams of anhydrous ammonia and 3 grams of concentrated hydrochloric acid. The vessel was then heated at 30±5° C. for 3½ hours, the pressure within the vessel being approximately 75 p. s. i. at the start of the reaction and diminishing as the reaction progressed. The desired pyrimidine product was recovered in a yield of 48%, based on the amount of acetone employed, by first adding 250 grams of solid sodium hydroxide to the reaction mixture and thereafter separating off and distilling the resultant upper liquid layer. In similar experiments separation was effected in an equally efficient manner by diluting the reaction mixture with an equal volume of benzene, separating the resultant upper layer and thereafter distilling the same following neutralization with a dilute solution of sodium hydroxide.

The 2,2,4,4,6-pentamethyltetrahydropyrimidine compound had a boiling point of 169 to 171° C. at atmospheric pressure (104.6 to 105° C. at 100 mm. Hg), a refractive index 20/D of 1.4560 and a specific gravity 20/4 of 0.883.

Example II

The reaction described in the foregoing example was conducted under similar conditions except that an equivalent amount of nitric acid was substituted for hydrochloric acid as catalyst. In this case, the conversion to 2,2,4,4,6-pentamethyltetrahydropyrimidine was increased to 51%.

Example III

It is also possible to prepare the 2,2,4,4,6-pentamethyltetrahydropyrimidine compound by employing a bimolecular condensation product of acetone such as diacetone alcohol or mesityl oxide instead of acetone itself. However, it is believed in that such products decomposed to acetone or an acetone-like monomer during the course of the reaction, and therefore use of these condensation products is equivalent to using acetone itself. Thus, 2,2,4,4,6-pentamethyltetrahydropyrimidine was formed by mixing 10 moles of diacetone alcohol with 13.5 moles of anhydrous ammonia and 5 grams of ammonium chloride, and reacting the mixture for 3½ hours at a temperature between 40 and 50° C. and at pressures between 50 and 150 pounds per square inch. The desired tetrahydropyrimidine product was recovered from the reaction mixture in a yield of 47% based on the weight of diacetone alcohol employed, the recovery being effected by the dehydration and distillation technique set forth in Example I above.

Example IV

Substantially the same yields of 2,2,4,4,6-pentamethyltetrahydropyrimidine as indicated in the foregoing paragraph are obtained by substituting equivalent amounts of mesityl acid for the diacetone alcohol, the reaction conditions being otherwise the same. In this operation 2,4-dimethyl-2,4,6-triethyltetrahydropyrimidine was prepared by reacting 30 moles of methyl ethyl ketone with 26.5 moles of ammonia in the presence of 5 grams of concentrated hydrochloric acid. The reaction was conducted at room temperatures and extended over a period of 20 hours, during which time the pressure within the system varied from approximately 100 to 15 p. s. i. The resulting reaction mixture on being dehydrated by the addition of caustic and thereafter distilled yielded 340 grams of 2,4-dimethyl-2,4,6-triethyltetrahydropyrimidine, a compound having a boiling point (100 mm. Hg) of 151° C., a specific gravity 20/4 of 0.8867 and a refractive index 20/D of 1.4639.

The invention claimed is:

1. The method of producing 2,2,4,4,6-pentamethyltetrahydropyrimidine, said method comprising reacting ammonia with acetone in the presence of an acidic condensation catalyst.

2. The method of claim 1 wherein the reactants are supplied in an ammonia/acetone mole ratio of from 0.5 to 1, and wherein the reaction is conducted at a temperature of from 25 to 100° C. and at a pressure of from 3 to 50 atmospheres for at least one-half hour.

3. The method of preparing 2,2,4,4,6-pentamethyltetrahydropyrimidine, said method comprising reacting ammonia with at least one compound selected from the group consisting of acetone and its bimolecular condensation products mesityl oxide and diacetone alcohol, said reaction being conducted in the presence of an acidic condensation catalyst.

4. The method of producing 2,4-dimethyl-2,4,6-triethyltetrahydropyrimidine, said method comprising reacting ammonia and methyl ethyl ketone in the presence of an acidic condensation catalyst.

5. The method of claim 4 wherein the reactants are added in an ammonia/methyl ethyl ketone ratio of from 0.5 to 1, and wherein the reaction is conducted at a temperature of from 25 to 100° C. and at a pressure of from 3 to 50 atmospheres for at least one-half hour.

6. The method of preparing a 2,4-dimethyl-2,4,6-trialkyltetrahydropyrimidine containing from 9 to 30 carbon atoms in the molecule, said method comprising reacting ammonia and a ketone of the general structure $RCOCH_3$, where R is an alkyl radical containing from 1 to 8 carbon atoms, said reactants being added in an ammonia/ketone mole ratio of from 0.25 to 1.5, and the reaction being conducted in the presence of an acidic condensation catalyst, at a temperature of from 15 to 150° C., and at a superatmospheric pressure.

7. The method of claim 6 wherein the reactants are added in an ammonia/ketone ratio of from 0.5 to 1, and wherein the reaction is conducted in the presence of an acidic condensation catalyst, at a temperature of from 25 to 100° C., and at a pressure of from 3 to 50 atmospheres.

8. The method of preparing a tetrahydropyrimidine compound, said method comprising reacting anhydrous ammonia and a monoketone wherein the carbonylic carbon atom and an adjacent carbon atom bearing at least one hydrogen atom are members of an open chain of carbon atoms, said reactants being added in an ammonia/ketone mole ratio of from 0.25 to 1.5, and the reaction being conducted in the presence of an acidic condensation catalyst, at a temperature of from 15 to 150° C., and at a superatmospheric pressure.

9. The method of claim 8 wherein the reactants are added in an ammonia/ketone ratio of from 0.5 to 1, and wherein the reaction is conducted in the presence of an acidic condensation catalyst, at a temperature of from 25 to 100° C., and at a pressure of from 3 to 50 atmospheres.

10. The method of preparing tetrahydropyrimidine compounds, said method comprising reacting ammonia and a monoketone wherein the carbonylic carbon atom and an adjacent carbon atom bearing at least one hydrogen atom are members of an open chain of carbon atoms, said reaction being conducted in the presence of an acidic condensation catalyst.

11. The method of claim 10 wherein the ketone reactant contains between 3 and 10 carbon atoms in the molecule and has only hydrocarbyl groups attached to the carbonyl carbon atom.

12. The method of claim 10 wherein the ketone reactant has the general structure $RCOCH_3$, R being an alkyl radical of from 1 to 8 carbon atoms.

13. As a new chemical compound, 2,2,4,4,6-pentamethyltetrahydropyrimidine.

14. As a new chemical compound, 2,4-dimethyl-2,4,6-triethyltetrahydropyrimidine.

15. As a new chemical compound, a 2,4-dimethyl-2,4,6-trialkyltetrahydropyrimidine.

16. A 2,3,4,5-tetrahydropyrimidine derivative containing from 9 to 30 carbon atoms and having a total of at least 5 separate hydrocarbyl groups attached to not less than 3 different carbon atoms of the 2,3,4,5-tetrahydropyrimidine nucleus.

VERNON E. HAURY.

REFERENCES CITED

The following references are of record in the file of this patent:

Bradbury et al., J. Chem. Soc., 1947, 1394–1399.